US009641363B2

(12) United States Patent
Lea et al.

(10) Patent No.: US 9,641,363 B2
(45) Date of Patent: May 2, 2017

(54) SYSTEM FOR TRIGGERING ACTIONS ON COMPUTING DEVICES VIA AUDIO SIGNALS

(71) Applicant: Wham City Lights, Inc, Baltimore, MD (US)

(72) Inventors: Keith Michael Lea, Baltimore, MD (US); Daniel Robert Deacon, Baltimore, MD (US); Alan Michael Resnick, Baltimore, MD (US)

( * ) Notice: Subject to any disclaimer, the term of this patent is extended or adjusted under 35 U.S.C. 154(b) by 241 days.

(21) Appl. No.: 14/460,646

(22) Filed: Aug. 15, 2014

(65) Prior Publication Data

US 2015/0081071 A1 Mar. 19, 2015

Related U.S. Application Data

(60) Provisional application No. 61/871,713, filed on Aug. 29, 2013.

(51) Int. Cl.
| | |
|---|---|
| *G06F 17/00* | (2006.01) |
| *H04L 27/00* | (2006.01) |
| *G10L 19/018* | (2013.01) |
| *H04B 11/00* | (2006.01) |
| *H04S 3/00* | (2006.01) |
| *H04R 27/00* | (2006.01) |
| *H04L 27/26* | (2006.01) |

(52) U.S. Cl.
CPC ............ *H04L 27/00* (2013.01); *G10L 19/018* (2013.01); *H04B 11/00* (2013.01); *H04S 3/00* (2013.01); *H04L 27/265* (2013.01); *H04R 27/00* (2013.01); *H04R 2420/07* (2013.01)

(58) Field of Classification Search
CPC . H04S 1/007; G06F 3/16; G06F 3/165; G10L 19/018; H04B 11/00; H04B 1/06; H05B 37/0236
See application file for complete search history.

(56) References Cited

U.S. PATENT DOCUMENTS

| | | | |
|---|---|---|---|
| 6,947,893 B1 * | 9/2005 | Iwaki | G01C 21/3629 701/441 |
| 7,383,297 B1 † | 6/2008 | Atsmon | |
| 7,460,991 B2 | 12/2008 | Jones | |
| 7,505,823 B1 | 3/2009 | Bartlett | |

(Continued)

FOREIGN PATENT DOCUMENTS

WO 2014068065 A2 † 5/2014

*Primary Examiner* — Fan Tsang
*Assistant Examiner* — David Siegel
(74) *Attorney, Agent, or Firm* — Baker, Donelson, Bearman, Caldwell & Berkowitz, PC; Royal W. Craig

(57) ABSTRACT

A system and method effective to trigger precisely timed actions on computing devices. The system may include a transmitting device and a receiving device. The transmitter may modulate binary data into sound waves, and the receiver may demodulate the audio signal into binary data. Signal amplitude across a range of frequencies may be used to demodulate. The received data may be interpreted in order to trigger actions on the computing device. These actions may involve the device's screen, speaker, built-in lights, camera, or vibration function. The actions may change over time based on the time at which the signal was received. More actions may be loaded from the device's storage.

18 Claims, 4 Drawing Sheets

(56) References Cited

U.S. PATENT DOCUMENTS

| | | |
|---|---|---|
| 8,401,569 B1 | 3/2013 | Bell |
| 8,499,038 B1 † | 7/2013 | Vucurevich |
| 9,215,018 B2 * | 12/2015 | Czapla .................. H04H 20/61 |
| 2011/0118003 A1 † | 5/2011 | Nakamura |
| 2012/0051187 A1 | 3/2012 | Paulson |
| 2012/0134238 A1 * | 5/2012 | Surprenant ............. H04S 1/007 |
| | | 367/137 |
| 2013/0109364 A1 † | 5/2013 | Mercuri |
| 2013/0268277 A1 | 10/2013 | Duplan |

\* cited by examiner
† cited by third party

SYSTEM FOR TRIGGERING ACTIONS ON COMPUTING DEVICES VIA AUDIO SIGNALS

CROSS-REFERENCE TO RELATED APPLICATION(S)

The present application derives priority from U.S. provisional application Ser. No. 61/871,713 filed 29 Aug. 2013.

BACKGROUND OF THE INVENTION

1. Field of the Invention

The present invention relates generally to signal processing, and more specifically, to a method for modulating binary data into audio signals transmitted as sound waves, and for demodulating the data from the sound waves in order to trigger actions at a computing device.

2. Description of the Background

Our music listening experience depends primarily on our sense of hearing, but it can be greatly enhanced by visual sensations. This is clear from live stage shows in which colored stage lighting and lasers are used to enhance the audience's experience. There are prior art systems that imitate a light show on a mobile computing device by direct response to sound vibrations, but the resulting light show is quite random and not well-synchronized to the sound of the music.

What is needed is a system and method to more effectively trigger time-based content via modulated digital communication transmitted through the air via audio waves. Related art includes several systems which allow communication from and/or to smartphones, using audio signals. These systems are inadequate for synchronizing heterogeneous groups of computing devices in noisy environments. Existing systems that modulate frequency or phase are not resilient to environmental noise present in event environments.

Existing systems which modulate amplitude of fewer than 20 frequencies, or a band of less than 2 kilohertz, are not sufficiently resilient to the varying frequency response of mobile computing devices, of which there are hundreds of popular models with many different models of microphone transducer, different operating systems, and different types of processors. Frequency response for these devices is often limited in certain parts of the audio spectrum. Existing amplitude modulation systems are also not resilient to music or other audio that may be playing alongside the audio signal, which may include waves at frequencies which mask the audio signal in its narrow spectral range.

These systems are also inadequate for causing hundreds or thousands of heterogeneous devices to appear to act in a tightly synchronized fashion. For example, an event organizer or sound engineer may want to control the behavior of a large number of mobile computing devices, such as smartphones, to cause the smartphones to flush colors or play sounds in a synchronized fashion, all at the whim of the operator. With the prior art methods, audio signal timing information is not stored precisely, producing a margin of error dependent on the device's audio buffer sizes, context switching algorithm, and other varying factors.

Such synchronization across mobile devices in a physical space is necessary for many spectacular visual effects, and also necessary for reducing audible interference or distortion when the devices emit audio waves. When devices are even a quarter-second off from each other, effects like strobing lights or rapid screen color changes are not visually striking. And when the devices are playing music or sequenced audio, even a tenth of a second of variance can cause even familiar music to sound odd and even unrecognizable.

SUMMARY OF THE INVENTION

The present invention is a system and method for triggering actions on computing devices. The system may include a transmitting device and a receiving device. The transmitter may modulate binary data into sound waves, and the receiver may demodulate the audio signal into binary data. Signal amplitude across a range of frequencies may be used to demodulate. The received data may be interpreted in order to trigger actions on the computing device. These actions may involve the device's screen, speaker, built-in lights, camera, or vibration function.

The actions may change over time based on the time at which the signal was received. More actions may be loaded from the device's storage.

The invention, for example, allows an operator, such as an event organizer or sound engineer, to control the behavior of a large number of computing devices, such as smartphones.

The operator can simultaneously trigger actions on thousands of devices in a single geographic area, or all over the world, if connected via radio, television, or a network or other apparatus. All of the smartphones can flash or play sounds in a synchronized fashion, at the whim of the operator.

DETAILED DESCRIPTION OF THE PREFERRED EMBODIMENTS

The present invention is a system and method which allows a single operator to trigger and coordinate content on one or more computing devices using signals embedded in sound waves. The operator is typically a sound engineer, event organizer, lighting designer, or producer of an event.

Figure 1:
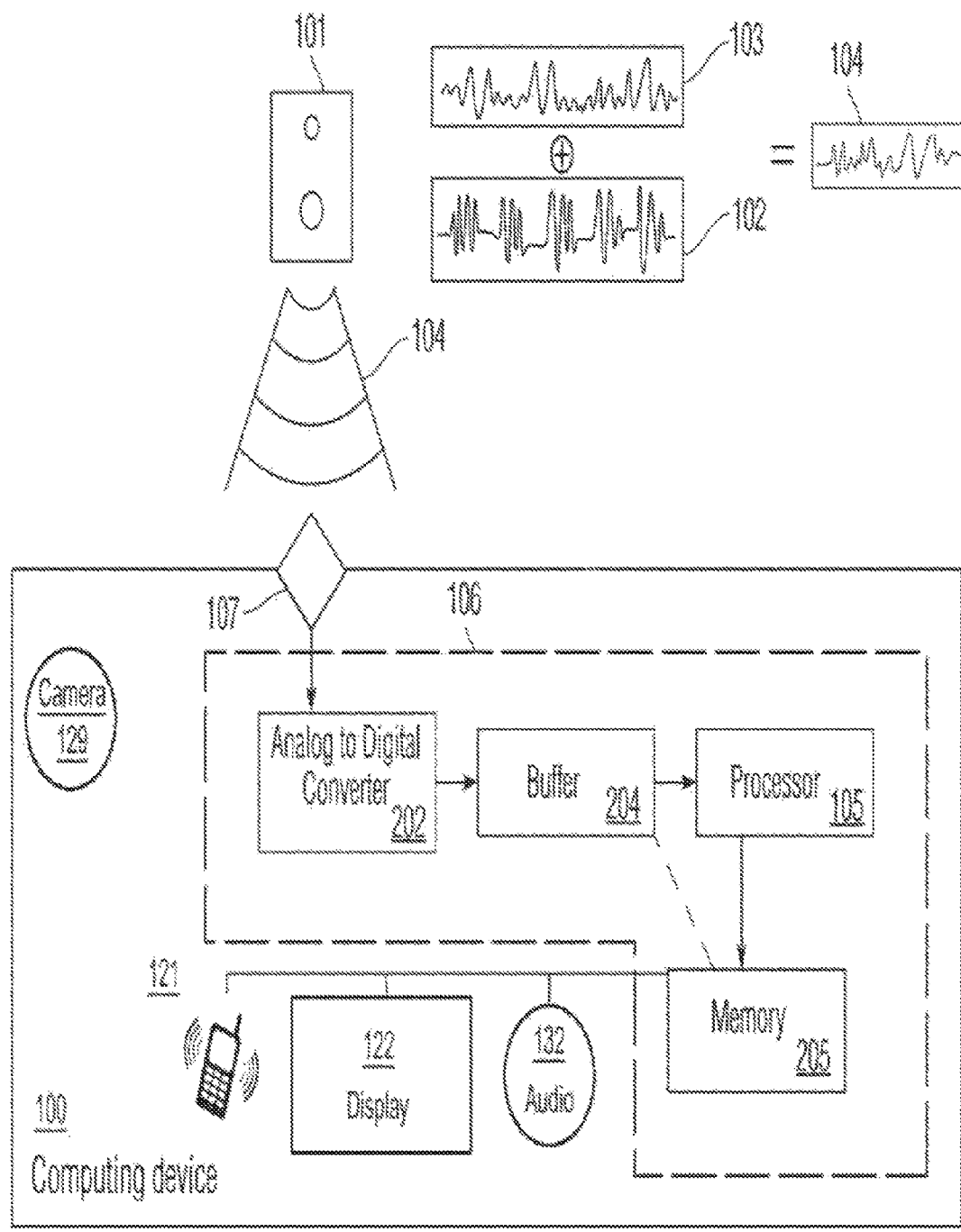
FIG. 1 is an overview of the system according to the invention.

As shown in FIG. 1, the operator has access to an audio transducer or speaker 101 which can emit standard audio frequencies (ranging between 20-16,000 hertz) as well as ultrasonic frequencies (defined herein as above 16,000 hertz) specially encoded with digital data as will be described.

Speaker 101 may be a conventional loudspeaker modified to include an ultrasonic speaker element. A variety of suitable ultrasonic transducer elements exist for generating sound in the ultrasonic frequency range. The speaker 101 emits both a modulated signal 102 in the inaudible ultrasonic range, as well as an audible signal 103 (which may contain any sounds or music), if any. The audible signal 103 is mixed with the modulated signal 102 during propagation as shown at 104. The mixed signal 104 is received at a computing device 100 by an attached transducer or microphone 107.

The computing device 100 includes a processor board 106 with an analog-to-digital (A/D) converter 202, non-transitory memory 205 such as random access memory (RAM), buffer memory 204 (a region of a physical memory storage used to temporarily store data while it is being moved from A/D Converter (analog/digital converter) 202), and a processor 105 for continually processing audio received from transducer or microphone 107 by analog-to-digital conversion and digital sampling (in a well-known manner). One skilled in the art will understand that buffer memory 204 may be a region of memory 205.

Figure 2:
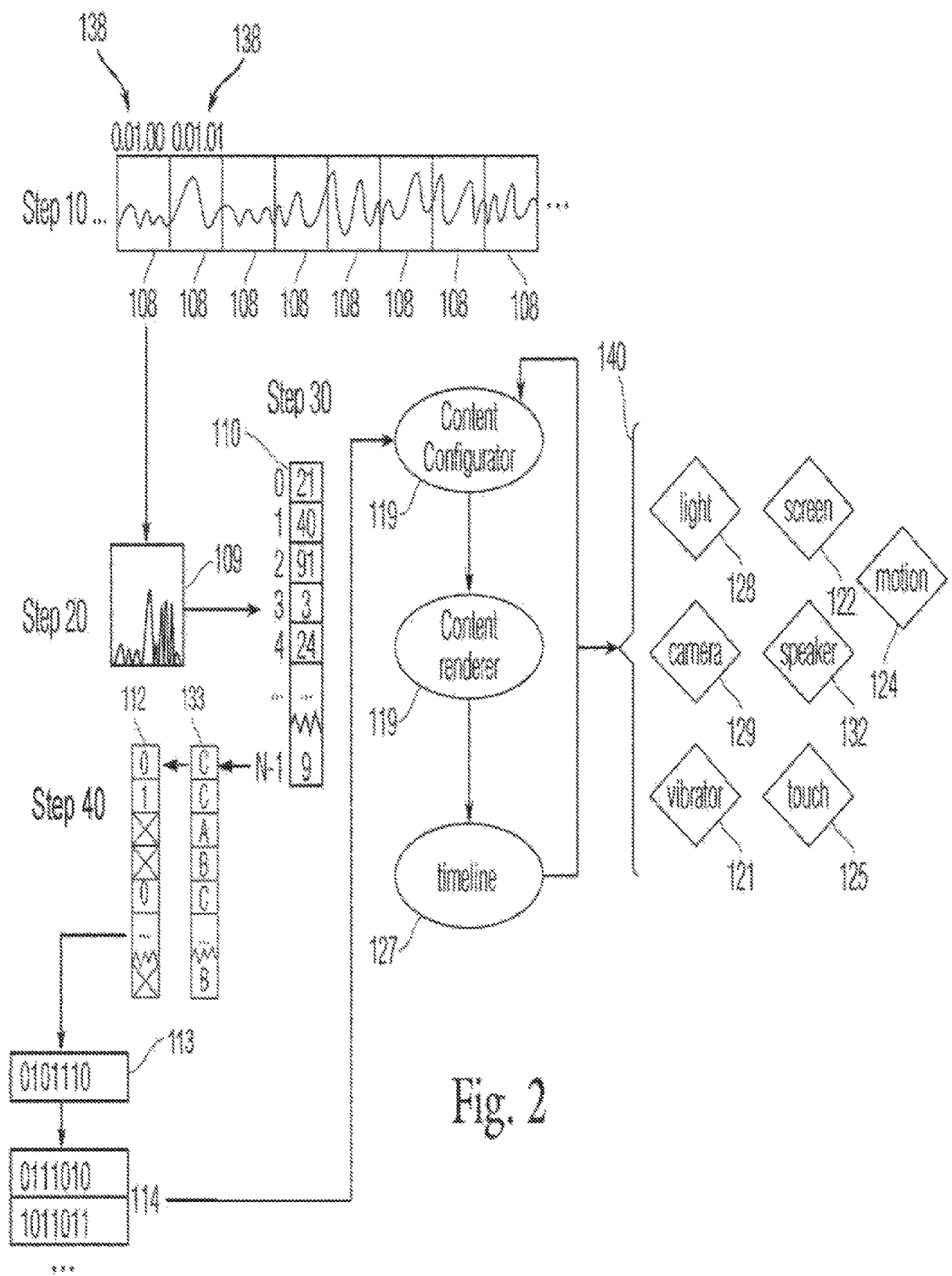
FIG. 2 is a process flow diagram illustrating the steps of the process, including arrows describing the data and/or control that flows between different aspects of the invention.

FIG. 2 is a process flow diagram illustrating the steps of the process. At step 10 the stream of samples from A/D converter 202 is divided into segments 108 which are stored in buffer memory 204 either directly by direct memory access or under processor 105 control. Each segment contains a subset of samples received during a defined period in time 138, and the segments may overlap each other.

At step 20 the processor 105 performs a scalar quantization operation to extract amplitudes of various frequencies in the samples 108, thus transforming each segment of audio samples 108 into a frequency/amplitude vector 109 which is stored in the computing device 100's RAM memory 205. This entails a Fourier transform, a known signal transformation technique from signal processing. The frequency/amplitude vector 109 comprises a sequence of N frequencies, distributed throughout the frequency spectrum (audible and/or inaudible). There is a Fast Fourier Transform (FFT) that is built into the Apple® iOS operating platform that can be used for this purpose, and for the Android mobile operating system (OS) currently developed by Google® an opensource library called JTransforms™ can be used.

Figure 3:
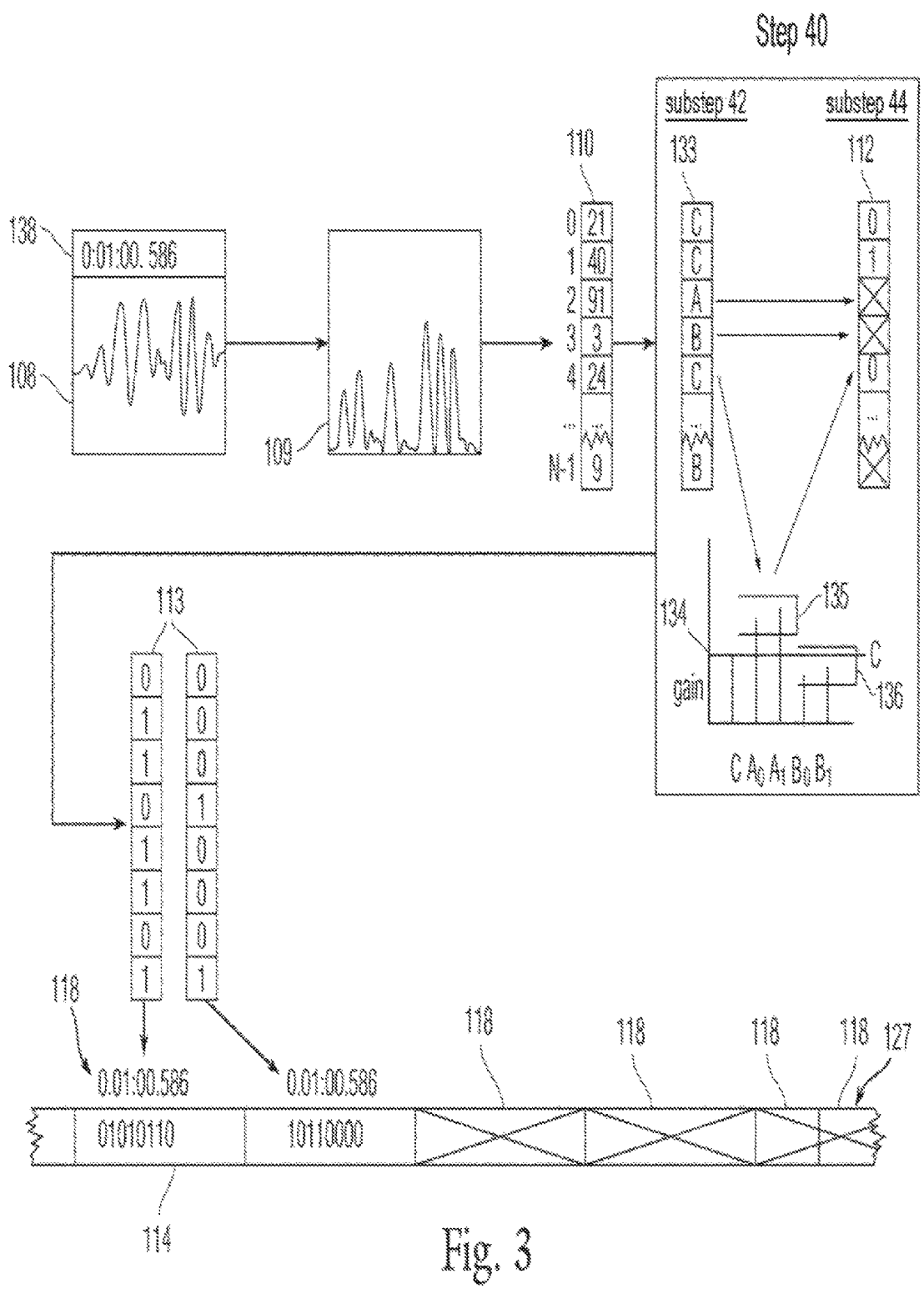
FIG. 3 is a flowchart illustrating extraction of data bytes from a segment of audio samples, and appending the data bytes to a stream.

At step 30 the frequency/amplitude vector 109 is then converted to an amplitude vector 110 in which the amplitude at each frequency $F_N$ is stored in the vector 110 at the appropriate positions. More specifically, as described below in regard to FIG. 3, the amplitude at each discrete frequency may be represented by its position in an amplitude vector 110 of size N store in the computing device 100 random access memory. Regular intervals might be used to ensure that the frequencies are mathematically orthogonal to each other, to reduce interference. Alternatively, irregular intervals may be used to improve the aesthetics of the sound. These frequencies and intervals must match exactly those which the operator is using to transmit the signals. FIG. 3 is a more detailed illustration of this process. For amplitude vector 110, the amplitude (e.g., 91) at each frequency (e.g., 2 hz) is stored in the vector 110 at the appropriate positions.

Next, at Step 40 the processor 105 then interprets these N amplitudes of vector 110 into a series of M digits (bits) 112. As a result, each bit of byte 112 may have a binary value and/or a third null value (X) indicating that data is not present the signal for that bit. This interpreting step is shown in more detail in FIG. 3 and entails two substeps.

In substep 42, each of the N amplitude values of vector 110 is assigned one of three labels, for example: (A) expected signal amplitude, (B) expected environmental noise amplitude, or (C) actual signal amplitude. These label assignments must match exactly the labels that the operator used to modulate the audio signal, so each frequency's amplitude is interpreted as it was intended—these can be determined by the computing device 100 heuristically, by scanning the amplitude vector for pairs of high A values and tow B values. Alternatively, the label assignments can be pre-stored as part of the software code. The total number of assigned labels (of A, B, and C) is equal to N, and the ratio of assigned labels A:B:C is preferably 1:1:2. The preferable pattern for illustrated vector 110 would be C,C,A,B,C,C,A,B, and so on. This way, each C value's frequency is nearby in the audio spectrum to both an A value and a B value. As the C amplitude values are compared to the nearest A and B values to determine the value of the bit, this scheme reduces the effect of frequency response attenuation common to low-end transducers.

For example, if the device's 100 transducer 107 attenuates frequencies between 10,000 Hz and 12,000 Hz by 10 decibels, and several A, B, and C values were located within that part of the spectrum, all A/B/C values would be attenuated by 10 decibels. Thus, when comparing a given C value to its nearby A and B values, the proximity of a given C value to its nearby A or B values would more closely match that of the operator's transmitted audio signal. The stated 1:1:2 ratio strikes a desirable balance between reliability and efficiency. More A and B values would allow for more accurate environmental noise amplitude values; alternatively, more C values would allow more data to be transferred, because more frequencies would be devoted to data transmission.

If assigned as (C), the value is also associated with a position in a bit vector 112 stored in the computing device 100 RAM. The purpose of this process is to derive one or more data bytes (made up of 8 bits each). Multiple frequencies may be assigned to a single bit position in a data byte, for the purpose of redundancy—allowing multiple frequencies to affect the same bit reduces the risk of the signal being unable to be reconstructed due to interference or noise at specific frequencies. For example, if bit position 1 corresponds to frequencies around 600 Hz, 800 Hz, and 1000 Hz, then even in the presence of environmental noise/interference at 800 Hz, bit 1 will be decoded correctly because of the sound energy at 600 Hz and 1000 Hz. Thus, for each C value, the amplitude may be combined (via mean, median, or other known aggregation method) with other C values which are known to represent the same position in the data byte 113 described in the next paragraph.

In a second interpretation substep 44 the processor interprets these ABC values into a vector 112 of M digits (bits). Each A and B value is assigned null value (X) indicating that data is not present in the signal for that bit. As shown below, each C value is compared with one or more A values and B values, and the proximity 134 of the (C) amplitude to either A or B determines the value of the bit at that position in the vector 112. If C's proximity to the A values is within set thresholds 135, the bit will be stored as a 1. If C's proximity to the B values is within set threshold 136, the bit will be stored as a 0. If the C values have a mean, median, mode, or variance beyond various thresholds, the being possibly related or not related to A and/or B 136, the bit will be deemed as not present in the signal. Thresholds 135, 136 are a matter of design choice, for example, +/−20%, and are most preferably quantitatively determined and tuned by testing and comparing error rates vs. success rates using various thresholds.

Once the bit vector 112 of size N has been filled with 0, 1, or "not present" (null) values during the previous steps, the processor 105 attempts to transform it into one or more data bytes 113. As each bit position in the bit vector 112 is associated with a bit position in the data bytes 113, there may be multiple bits from 112 associated with a single bit in the data byte 113.

For each bit in the data bytes 113, the quality and accuracy of that bit is verified. By comparing each associated bit in the bit vector 112 the processor 105 verifies that the data is appropriately redundant, using both the amplitude values 110 and the bit vector 112. "Not present" bit values may be ignored and may not contribute to the final result, unless all associated bits are not present, in which case processing for this audio segment may stop altogether, and the data abandoned. If found to be appropriately redundant, the bit value is stored at the associated position in the associated data byte 113.

After processing, if one or more data bytes 113 have been generated from a segment of audio 108, the data bytes 113 are appended to the end of a data byte stream 114 along with the associated audio segment's arrival time 138. This may be implemented by pushing each byte onto a queue to form a timeline 127, as seen at the bottom of FIG. 3. The processor 105 interprets segments of the byte stream 114 as "activation data", e.g., discrete triggers, based on numeric values extracted from the byte stream and appended "time tag" (audio segment's arrival time 138).

Figure 4:
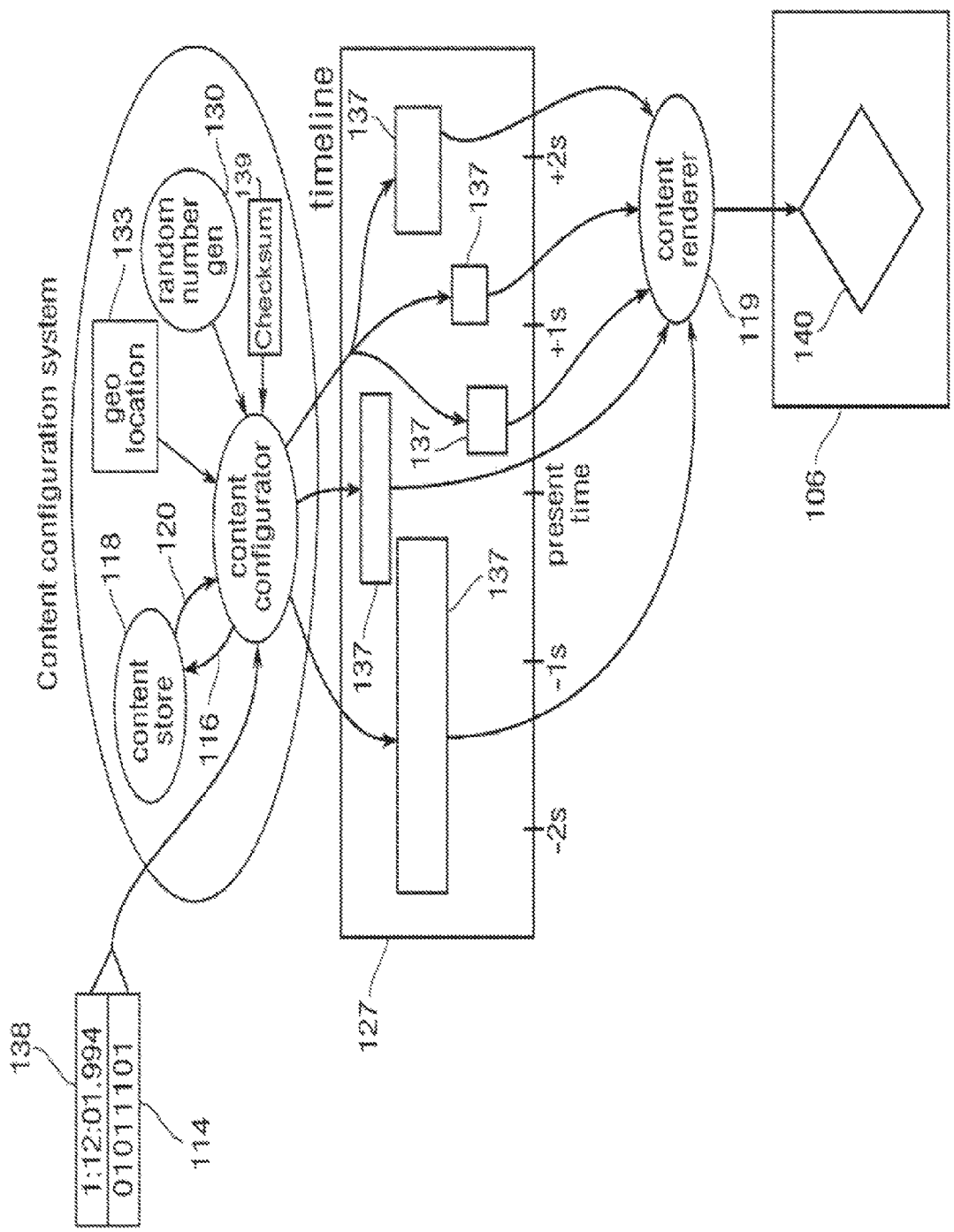
FIG. 4 is a flowchart illustrating processor interpretation of data to affect a computing device and its attached components.

As seen in FIG. 4, these numeric values may include contain a checksum 139 used for error correction, trigger type, content identifier 116, and/or other parameters. If a content identifier 116 is present, the content associated with that identifier may be loaded from a remote content store 118 and processed by a content renderer 119.

Data byte stream 114 along with the associated audio segment's arrival time 138 and parameters 115-118 are passed to a content renderer 119.

The content renderer 119 may use the trigger type, parameters, content 120, a random number generator 130, and/or the user's geographic location 133 or proximity to one or more transducers, to activate one or more components attached to the computing device 100.

These components may be activated in real time or may be scheduled for activation at specific times in the past or future 127, based on the content, trigger parameters, and the arrival time of the audio samples 108 (this configured time-based content 137 is placed on the timeline 127).

The content renderer 119 is a software module that decides when and how to activate one or more components attached to the computing device 100 based on trigger type, parameters, content 120, a random number generator 130, and/or user's geographic location 133 or user proximity. For example, the content renderer 119 may determine, based on the trigger and associated parameters, that the trigger intends to "flash" the LED light 128 attached to the device, in the following fashion: (a) the light will start flashing 5.3 seconds from when the signal was received; (b) the flashing will consist of turning on the light for 0.3 seconds, followed by 0.6 seconds off, in a repeating sequence; and (c) the flashing sequence will repeat for 60 seconds.

In another example at a live event with a stage, the content renderer 119 may determine that the screen 122 should display a solid color, the hue of the color determined by a random number generator 130, and the brightness of the color determined by the device's geographic proximity 133 to the stage.

More specifically, the content renderer may activate one or more components 140 attached to the computing device 100. It may display static or dynamic visual content on the device's screen 122. This visual content may be loaded from system memory or storage 123 attached to the processor. The visual content may include video, animation, colors, or patterns. The content renderer may vibrate the device 121. The content renderer may emit sound from an attached transducer or speaker 132, or a sound system connected to the device electrically or wirelessly. This sound may be loaded from system memory or storage, or synthesized based on content 120 and/or parameters. The content renderer may interpret the device user's location 133, physical movements 124, and/or screen touches 125 to modify the content being displayed, for example to slow down or speed up an animation, or to alter a color scheme. The renderer may enable one or more lights 128 attached to the computing device, and may turn the light on, off, or change its intensity or color. The content renderer may capture and store photos or video using an attached camera 129. The content renderer may generate more content and triggers to be processed.

Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

The invention claimed is:

1. A method for triggering actions at a remote computing device, comprising the steps of:
   receiving an audible signal at a first computer device;
   digitizing said audible signal by analog-to-digital conversion and digital sampling of said audible signal;
   demodulating activation data from the digitized sound signal comprising the substeps of:
      storing subsets of digital samples, each subset comprising a plurality of sequential digital samples of said audible signal over a predetermined time period;
      transforming each subset of digital samples into a frequency/amplitude vector;
      converting each frequency/amplitude vector to an amplitude vector indicating amplitude at each frequency; and
      interpreting the amplitudes of said amplitude vector as any one from among a group consisting of a binary "0", binary "1" and null value depending on said amplitude of said amplitude vector and a comparison of said amplitudes of said amplitude vectors; and
   triggering an action corresponding to the activation data demodulated from the digitized sound signal.

2. The method according to claim 1, wherein said activation data comprises a discrete trigger and appended time tag.

3. The method according to claim 2, wherein said step of triggering an action comprises triggering an action based on said discrete trigger and appended time tag.

4. The method according to claim 3, wherein said action comprises displaying content at said remote computing device.

5. The method according to claim 1, further comprising a step of modulating an audio signal at a second computing device with activation data, and broadcasting said audible signal to said second computing device.

6. A method for triggering actions at a remote computing device by activation data encoded onto an audible signal, comprising the steps of:
   modulating an audio signal with activation data;
   transducing said modulated audio signal into an audible signal;
   receiving said audible signal at a remote computing device;
   digitizing said audible signal by analog-to-digital conversion and digital sampling of said audible signal;
   demodulating the activation data from the digitized sound signal; comprising the substeps of:

storing subsets of digital samples, each subset comprising a plurality of sequential digital samples of said audible signal over a predetermined time period;

transforming each subset of digital samples into a frequency/amplitude vector;

converting each frequency/amplitude vector to an amplitude vector indicating amplitude at each frequency; and interpreting the amplitudes of said amplitude vector as any one from among a group consisting of a binary "0", binary "1" and null value depending on said amplitude of said amplitude vector and a comparison of said amplitudes of said amplitude vectors; and said remote computing device processing said demodulated activation data and triggering an action thereby.

7. The method according to claim 6, wherein said step of digitizing said audible signal further comprises appending each amplitude vector to a data queue and time-tagging each appended amplitude vector.

8. The method according to claim 7, further comprising a step of transmitting each amplitude vector in said data queue and associated time-tags to a content renderer comprising computer instructions stored on non-transitory computer memory on said remote computing device.

9. The method according to claim 8, wherein said step of modulating an audio signal with activation data further comprises modulating digital activation data including any one or more from among a group of trigger type, trigger parameters, content, a random number, user geographic location, or user proximity.

10. The method according to claim 9, wherein said step of triggering an action from said demodulated activation data further comprises triggering an action based on any one or a combination of said trigger type, trigger parameters, content, a random number, user geographic location, or user proximity.

11. The method according to claim 9, wherein said step of triggering an action further comprises any one or more actions chosen from among a group consisting of:

displaying an image on said remote computing device;
displaying a color on said remote computing device;
emitting audio from said remote computing device;
vibrating said remote computing device;
illuminating a light on said emote computing device;
taking a photograph with said remote computing device;
loading one or more additional actions from the device's storage, and
presenting a graphical user interface on said remote computing device.

12. The method according to claim 7, wherein said step of triggering an action further comprises changing said action over time based on the time tags.

13. The method according to claim 7, wherein said step of triggering an action further comprises changing said action over time based on the time tags.

14. The method according to claim 9, wherein said step of triggering an action further comprises selecting an action based on said random number.

15. A system for triggering actions at a remote computing device by activation data encoded onto an audible signal, comprising:

at least one microphone for transducing an audible sound;
an analog-to-digital converter for digitizing said audible sound;
a digital sampling circuit for digital sampling of said digitized audible signal;
a processor for demodulating the activation data from the digitized sound signal, wherein said processor
  stores subsets of digital samples, each subset comprising a plurality of sequential digital samples of said audible signal over a predetermined time period;
  transforms each subset of digital samples into a frequency/amplitude vector;
  converts each frequency/amplitude vector to an amplitude vector indicating amplitude at each frequency; and
  interprets the amplitudes of said amplitude vector as any one from among a group consisting of a binary "0", binary "1" and null value depending on said amplitude of said amplitude vector and a comparison of said amplitudes of said amplitude vectors; and
a content renderer comprising a plurality of software instructions stored on non-transitory computer memory for triggering one or more actions based on said activation data.

16. The system according to claim 15, wherein said activation data encoded onto said audible signal comprises any one or more from among a group consisting of trigger type, trigger parameters, content, one or more random numbers, user geographic location, or user proximity.

17. The system according to claim 15, wherein said processor appends each amplitude vector to a data queue and time-tags each appended amplitude vector.

18. The system according to claim 17, wherein said processor transmits each amplitude vector in said data queue and associated time-tags to said content renderer.

* * * * *